(12) United States Patent
McEwan (10) Patent No.: US 6,414,627 B1
(45) Date of Patent: Jul. 2, 2002

(54) HOMODYNE SWEPT-RANGE RADAR

(75) Inventor: Thomas E. McEwan, Carmel Highlands, CA (US)

(73) Assignee: McEwan Technologies, LLC, Monterey, CA (US)

( * ) Notice: Subject to any disclaimer, the term of this patent is extended or adjusted under 35 U.S.C. 154(b) by 0 days.

(21) Appl. No.: 09/416,835

(22) Filed: Oct. 12, 1999

(51) Int. Cl.[7] .............................................. G01S 13/10
(52) U.S. Cl. ......................... 342/134; 342/27; 342/82; 342/123; 342/124; 342/118; 342/192
(58) Field of Search ............................ 342/21, 27, 28, 342/82–88, 118, 120–125, 128–137, 175, 189–197, 106; 375/130; 356/5.03

(56) References Cited

U.S. PATENT DOCUMENTS

| | | | |
|---|---|---|---|
| 3,885,240 A | * 5/1975 | Jensen | ........................ 342/106 |
| 4,099,228 A | 7/1978 | Cohn | |
| 4,319,244 A | 3/1982 | Hirota et al. | |
| 4,320,536 A | 3/1982 | Dietrich | |
| 4,470,049 A | 9/1984 | Phaneuf et al. | |
| 4,518,256 A | * 5/1985 | Schwartz | ................... 356/5.03 |
| 4,539,530 A | 9/1985 | Mizumura et al. | |
| 4,810,976 A | 3/1989 | Cowley et al. | |
| 4,817,201 A | 3/1989 | Bonato | |
| 4,951,060 A | 8/1990 | Cohn | .......................... 342/175 |
| 5,345,471 A | * 9/1994 | McEwan | ..................... 375/130 |
| 5,345,601 A | 9/1994 | Takagi et al. | |
| 5,519,400 A | * 5/1996 | McEwan | ...................... 342/28 |
| 5,731,781 A | 3/1998 | Reed | .......................... 342/135 |
| 5,826,216 A | 10/1998 | Lyons et al. | |

* cited by examiner

*Primary Examiner*—Bernarr E. Gregory
(74) *Attorney, Agent, or Firm*—Mark A. Haynes; Haynes Beffel & Wolfeld LLP (57) ABSTRACT

A single-antenna short-range radar transceiver emits 24 GHz RF sinewave packets and samples echoes with strobed timing such that the illusion of wave propagation at the speed of sound is observed, thereby forming an ultrasound mimicking radar (UMR). A 12 GHz frequency-doubled transmit oscillator is pulsed a first time to transmit a 24 GHz harmonic burst and pulsed a second time to produce a 12 GHz local oscillator burst for a sub-harmonically pumped, coherently integrating sample-hold receiver (homodyne operation). The time between the first and second oscillator bursts is swept to form an expanded-time replica of echo bursts at the receiver output. A random phase RF marker pulse is interleaved with the coherent phase transmitted RF to aid in spectrum assessment of the radar's nearly undetectable emissions. The low-cost transceiver can be used for automotive backup and collision warning, precision radar rangefinding for fluid level sensing and robotics, precision radiolocation, wideband communications, and time-resolved holographic imaging.

39 Claims, 6 Drawing Sheets

HOMODYNE SWEPT-RANGE RADAR

BACKGROUND OF THE INVENTION

1. Field of the Invention

The present invention relates to wide bandwidth pulsed microwave transmitters and receivers, and more particularly to short-range, sub-nanosecond pulse, phase-coherent K-band radars.

2. Description of Related Art

Range measurement of close-range targets is of great interest to a number of industries. Automotive backup warning radar, fluid level sensing in tanks and vats, material level sensing in silos, safety systems, home "do-it-yourself" projects, and aids to the blind are but a few of the applications for non-contact short-range measurement.

Ultrasound is a ranging technology that is both simple and inexpensive. Unfortunately, it is of limited accuracy since the speed of sound varies 10% over outdoor temperatures. Accuracy is of central importance in tank level measurement and construction applications, where accuracies of 1% to 0.01% are needed. In addition to limited accuracy, ultrasound is susceptible to extraneous acoustic noise, and water or dirt overcoatings on its transducers can disable it. In spite of these limitations, ultrasound has been a popular ranging technology due to its simplicity and its ability to form a narrow beam with a small transducer.

Radar rangefinders are environmentally rugged: the speed of light (at which radar waves travel) does not vary with temperature (for all practical purposes), and radar waves propagate freely through wood walls, gypsum walls and plastic panels, even with an overcoating of water, ice, snow or dirt. Pulse-echo radars operating in the 24 GHz band have a wavelength of 12.5 mm, which is almost exactly the same wavelength as 24 kHz ultrasound. Since antenna beamwidth is determined by the wavelength to antenna aperture ratio, radar and ultrasound will have comparably narrow beamwidths with the same antenna/transducer footprint.

An ultrasonic rangefinder may typically transmit a burst of 12 sinusoidal cycles of acoustic energy with a corresponding pulse width that defines the two-object resolution of the system. Of course, its incremental resolution is not a function of emitted pulse width, but that of the timing system. A 24 GHz radar with the same two-object resolution as the 12-cycle ultrasound system needs to transmit a 12 cycle, 0.5-nanosecond sinusoidal burst at 24 GHz, since the wavelengths are comparable. Clearly, the radar needs to have a wide bandwidth, on the order of 2 GHz.

With the exception of copending application Ser. No. 09/238,455 by McEwan filed Jan. 28, 1999 now U.S. Pat. No. 6,191,724, prior art pulse-echo radars do not exhibit the combination of 1) K-band RF operation, e.g., 24 GHz, 2) sub-nanosecond RF pulse width, 3) extreme phase coherence (<10-picoseconds for the entire transmit-receive system, 4) expanded time output with ultrasonic parameters, 5) simple assembly with low cost surface mount technology (SMT) components, and 6) commercially appealing size and cost.

SUMMARY OF THE INVENTION

The present invention is a short-range radar transceiver (transmitter-receiver) that uses the same pulsed-RF oscillator as a transmit oscillator and as a swept-in-time pulsed receive local oscillator. This dual function use of one oscillator eliminates the need for two microwave oscillators and facilitates operation with only one antenna for both transmit and receive functions. Further, it assures optimal operation since there are no longer two oscillators that can go out of tune with each other (in a two oscillator system, both oscillators must be tuned to the same frequency).

In operation, a short sinusoidal RF burst is transmitted to and reflected from a target. Shortly after transmission, the same RF oscillator used to generate the transmit pulse is re-triggered to produce a local oscillator pulse (homodyne operation), which gates a sample-hold circuit in the receiver to produce a voltage sample. This process is repeated at a several megaHertz rate. With each successive repetition, another sample is taken and integrated with the previous sample to reduce the noise level. Also, each successive local oscillator pulse is delayed slightly from the previous pulse such that after about 10 milliseconds, the successive delay increments add up to a complete sweep or scan of perhaps 100-nanoseconds, or about 15 meters in range. After each scan, the local oscillator delay is reset to a minimum and the next scan cycle begins.

Figure 3A:
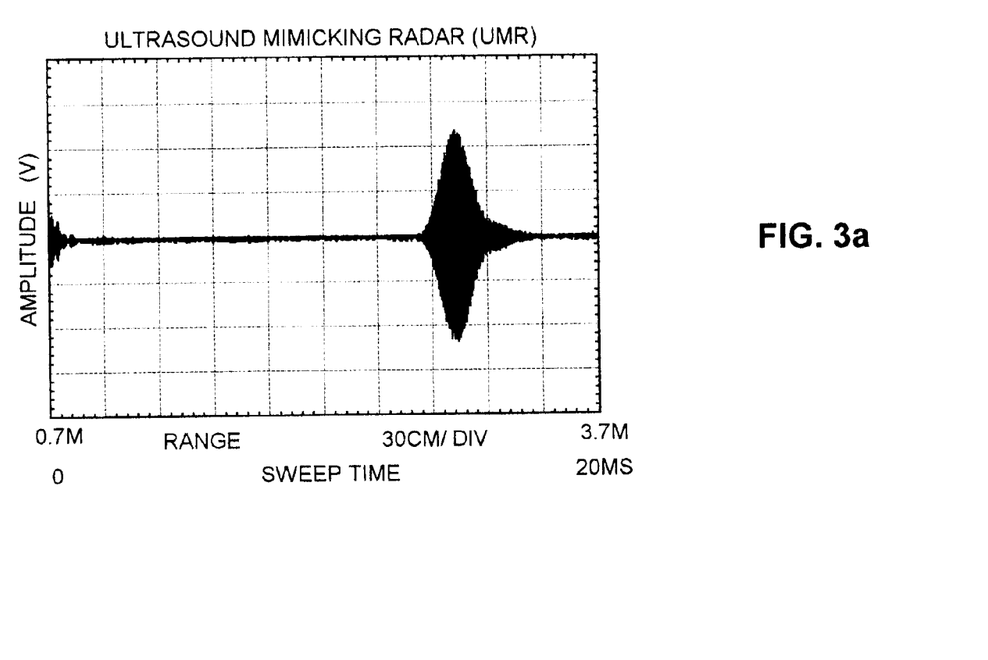
FIG. 3a plots the recorded baseband video output from a single antenna radar of FIG. 1.
Figure 3B:
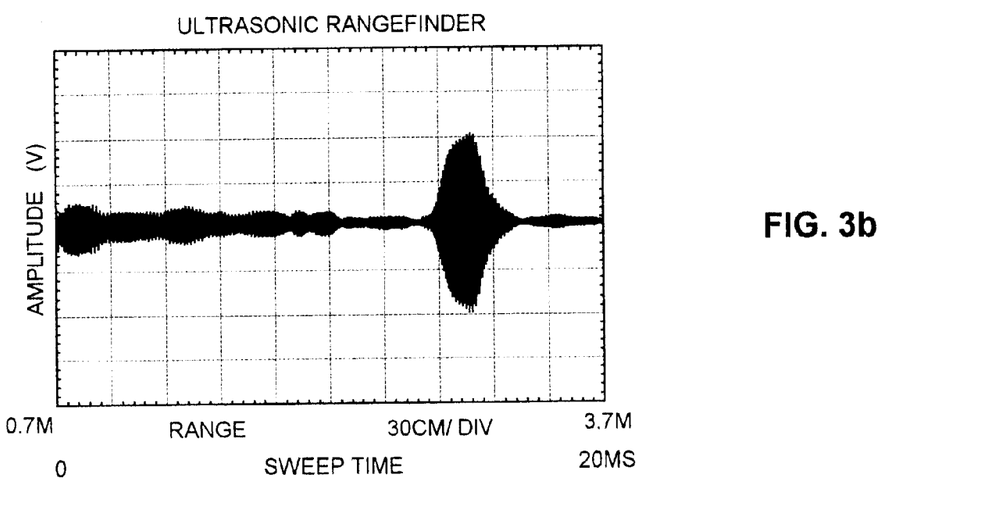
FIG. 3b plots the recorded baseband video output from an ultrasonic rangefinder (prior art).

The incremental scan technique produces a sampled voltage waveform on a millisecond scale that is a near replica of the RF waveform on a nanosecond scale. This equivalent time effect is effectively a dimensionless time expansion factor. If the expansion factor is set to 1-million, 24 GHz sinewaves are output from the system as 24 kHz sinewaves. Accordingly, the radar output can be made to appear like an ultrasonic ranging system. In addition to having the same frequency, e.g., 24 kHz, a 24 GHz radar actually has the same wavelength as a 24 kHz ultrasonic system. In addition, the range vs. round-trip time is the same (in equivalent time for the radar, of course). FIGS. 3a and 3b compare the radar of the present invention to an ultrasound rangefinder. The responses are similar, even though, one is electromagnetic and the other is acoustic. The present invention can be dubbed ultrasound mimicking radar (UMR).

Precision timing circuits are required for accurate expansion factors. Timing circuits having scale factor accuracies on the order of several tens of picoseconds or better can be realized with a Delay Locked Loop (DLL) such as a "Precision Digital Pulse Phase Generator" as disclosed by McEwan in U.S. Pat. No 5,563,605, or in copending application, "Phase-Comparator-Less Delay Locked Loop" Ser. No. 09/084,541, filed May 26, 1998, now U.S. Pat. No. 6,055,287, by McEwan. Alternatively, dual crystal clocks, one for transmit and one for receive, can be employed, where the receive clock is locked to a small offset frequency from the transmit clock, such as 100 Hz, thereby causing a steady phase slip of one complete clock cycle 100 times per second. In the process, the receive sampler timing smoothly sweeps across one complete pulse repetition interval (e.g., PRI=100 ns for a 10 MHz clock) every 10 ms in equivalent time. These dual oscillator timing circuits are described in copending applications "Self Locking Dual Frequency Clock System," Ser. No. 09/282,947 filed Apr. 1, 1999, and "Precision Radar Time Base Using Harmonically Related Offset Oscillators," Ser. No. 09/285,220, filed Apr. 1, 1999, now U.S. Pat. No. 6,072,427, both to McEwan.

The emission spectrum from a short-pulsed RF oscillator is very broad (often greater than 1 GHz) and appears very low in amplitude on a spectrum analyzer of limited bandwidth, e.g., 1 MHz bandwidth, as preferred in FCC tests. Consequently, a narrowband, incoherent RF marker pulse is interleaved with the short coherent RF pulses used for ranging to produce a very visible spectrum with an identifiable peak, i.e., carrier frequency. However, the marker pulse creates spurious echoes. Accordingly, the marker pulse is randomized in phase so its echoes average to zero in the receiver. At the same time, the desired ranging pulses phase-coherently integrate from pulse to pulse into a clean signal.

The present invention is a precision radar rangefinder that can be used in radars for many applications, e.g., tank level measurement, including 0.01% accurate custody transfer measurement; industrial and robotic controls; vehicle backup warning and collision radars; and general rangefinding applications. Since the present invention is phase coherent, microwave holograms can be formed using techniques known in the art, where the customary holographic reference beam is conveniently replaced by the internal phase coherent timing of the present invention.

A primary object of the present invention is to provide a precision, low cost radar ranging system with a narrow beamwidth using a single, small antenna and with an ultrasound-like output.

Yet another object of the present invention is to provide a wideband radar ranging system with a measurable center frequency.

Still another object of the present invention is to provide a radar having a single transmit/receive oscillator and a harmonic sampler that can be fabricated with common surface mount components.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1:
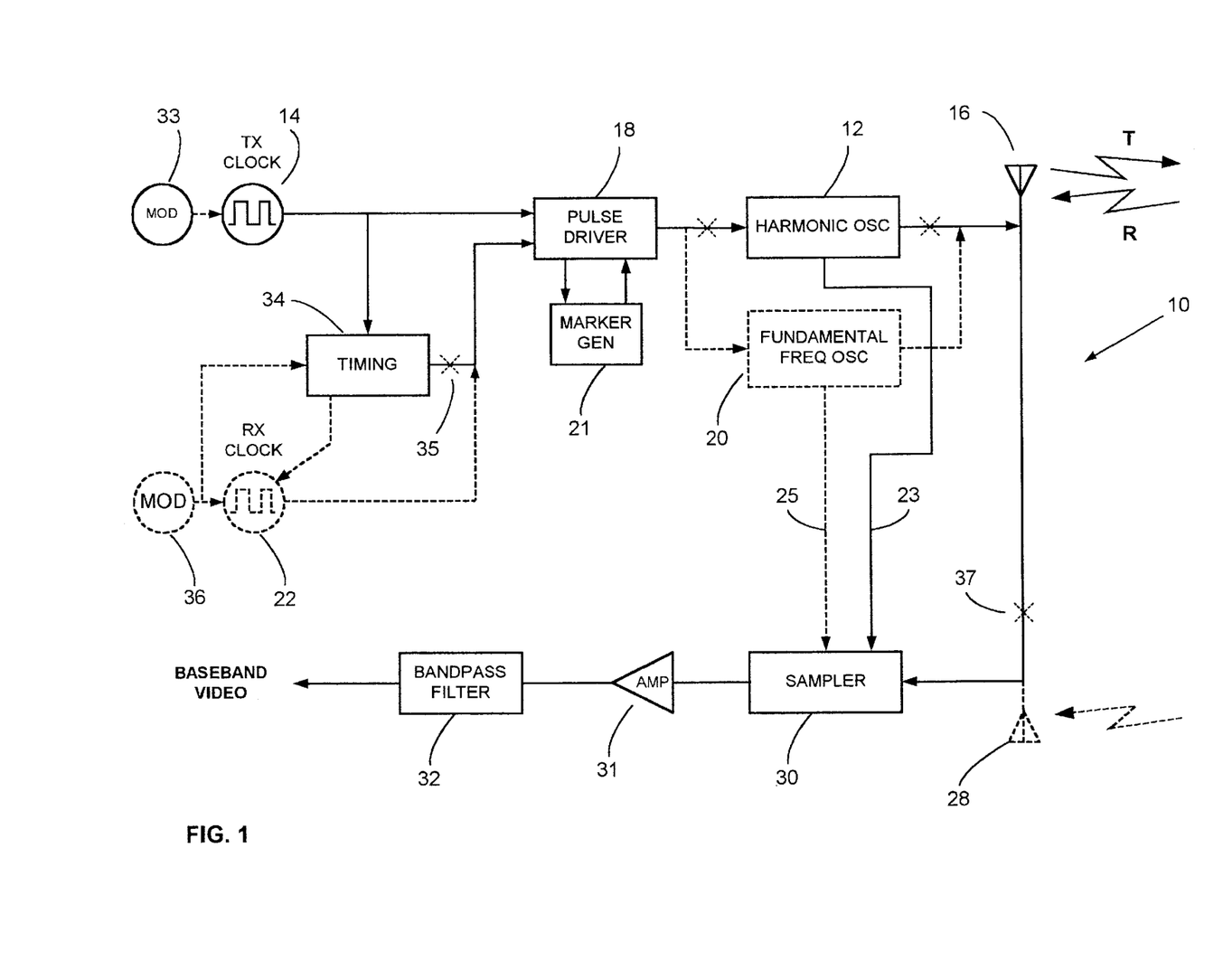
FIG. 1 is a block diagram showing the single-antenna short-pulse microwave radar transceiver of the present invention.

FIG. 1 is a block diagram of a microwave transceiver 10 of the present invention. A harmonic oscillator 12 receives clock pulses from transmit (TX) clock 14 via pulse driver 18 and produces RF burst pulses (transmit pulses T) at the transmit antenna 16. TX clock 14 typically produces a 1–10 MHz squarewave that is passed through pulse driver 18 to form ~1 ns wide pulses with rise and fall times on the order of 100 ps. Thus, the drive pulses are clock pulses with very fast rise and fall times. Therefore, the TX clock 14 and pulse driver 18 may together be viewed as a clock signal generator. These short pulses bias-on the harmonic oscillator 12, which is designed to start and stop oscillating very rapidly as a function of applied bias. The oscillations of the T pulses are phase coherent with the drive pulses, i.e., the phase of the RF sinusoids relative to the drive pulse remains constant, i.e., coherent, each time the oscillator is started—there is no significant clock-to-RF jitter. However, as will be discussed below with reference to the marker generator 21, separate marker pulses M may have a random phase relative to the clock.

A high degree of phase coherence for the T pulse can only be obtained with a very fast risetime drive pulse that shock excites the oscillator into oscillation. Accordingly, the pulse driver of the present invention has transition times of about 100 ps to ensure coherent oscillator startup.

Harmonic oscillator 12 typically operates at a fundamental frequency of 12.05 GHz with a second harmonic at 24.1 GHz. A frequency of 24.1 GHz or thereabouts is preferred since commercial and consumer devices such as radar rangefinders can operate in the 24.0–24.25 GHz band without a license. The transmitted RF bursts (T) are typically 12 cycles long at a carrier frequency of 24.1 GHz.

In a less preferred mode, a fundamental frequency oscillator 20 operating at 24.1 GHz can be used instead of a harmonic oscillator 12. A fundamental mode oscillator has a higher output amplitude but is far more difficult to implement in surface mount technology (SMT) since a quarter-wavelength at 24 GHz is 3 mm, about the same length as a SMT transistor package (including leads) that would be used for the oscillator. Obtaining oscillations in a SMT package at 24 GHz is nearly impossible.

A receive (RX) clock 22 typically produces a 1–10 MHz squarewave that is passed through pulse driver 18 to form ~1 ns wide pulses with rise and fall times below 100 ps. These short pulses bias-on the harmonic oscillator 12 in a similar fashion to the drive pulses triggered by the TX clock to form 0.5 ns wide gate pulses G. The G pulses gate the harmonic sampler 30 at typical frequency of 12 GHz via path 23 to sampler 30. Alternatively, a fundamental oscillator 20 is employed and gates sampler 30 at 24 GHz via path 25. Sampler 30 develops a detected signal, representing the coherent integration of multiple gatings of sampler 30, which is amplified by a low frequency amplifier 31 and filtered in bandpass filter 32 to produce a baseband video signal. Sampler 30 samples reflected signals R received by antenna 16.

The RX clock 22 is typically swept in time relative to the TX clock 14. A swept delay RX clock can be realized by the timing control unit 34 alone (acting as a delay element with controlled delay), when connected between TX clock 14 and pulse driver 18, with the offset frequency RX clock 22 omitted (dashed lines) and timing control unit 34 providing the RX clock. A means to accomplish precision swept timing has been described in co-pending application "Phase-Comparator-Less Delay Locked Loop," Ser. No. 09/084,541, filed May 26, 1998, now U.S. Pat. No. 6,055,287, by McEwan, which exhibits 0.01% linearity across a 10-meter measurement range.

Alternatively, swept timing can be realized by operating an RX clock 22 at a slightly lower, or offset, frequency than TX clock 14. Typically, the TX clock is a first quartz crystal oscillator, and the RX clock is a second quartz crystal oscillator that is phase locked to a typical offset of 100 Hz from the TX clock, such that the phase of the RX clock slips one full pulse repetition interval (PRI) every 10 ms. In this case, timing control unit 34 performs a phase-lock function between the TX and RX clocks and its timing output is not present, i.e., it is not directly connected to pulse driver 18 as indicated by the "X" 35.

With either type of swept timing, an equivalent time (ET) replica of the transmitted RF signal radiated from antenna 16 and received by the same antenna, or alternatively by antenna 28, (or radiated from a remote transmitter in the case of a radiolocation or communication system) appears at the harmonic sampler 30 output. When a separate receive antenna 28 is used, no path exists between antennas 16 and 28, as indicated by "X" 37. The ET replica resembles the RF signal, except it occurs on a slow time scale such as 10 ms. FIG. 3a provides an example of an ET replica signal on a 2-millisecond/div scale. In the typical case where the harmonic oscillator gate pulse G contains more than one RF cycle, the ET output is broadened somewhat by the convolution of the harmonic oscillator transmit pulse T and the harmonic oscillator gate pulse G.

The TX clock 14 can be modulated in frequency or phase, or with ON-OFF gating by optional modulator 33 for various purposes known in the art, such as spreading the spectral lines generated by harmonic oscillator 12 to reduce interference to other spectrum users. The modulation may be coded to distinguish the desired received signal from that of others. Modulator 36 is connected to the RX clock 22 or timing circuit 34 to demodulate coded signals from a remote transmitter using synchronization means know in the art of spread spectrum radio technology.

A marker generator 21 is triggered by pulses from the pulse driver to form marker pulses M which are much wider than the T or G pulses. Due to the width of the M pulses, the radiated spectrum becomes relatively narrow, since the emission spectrum is roughly related by 1/PW, where PW is the width of the emitted pulses. One purpose of the narrow marker pulse spectrum is to aid in identifying the RF carrier frequency and spectral width of the transmitted pulses.

Figure 2:
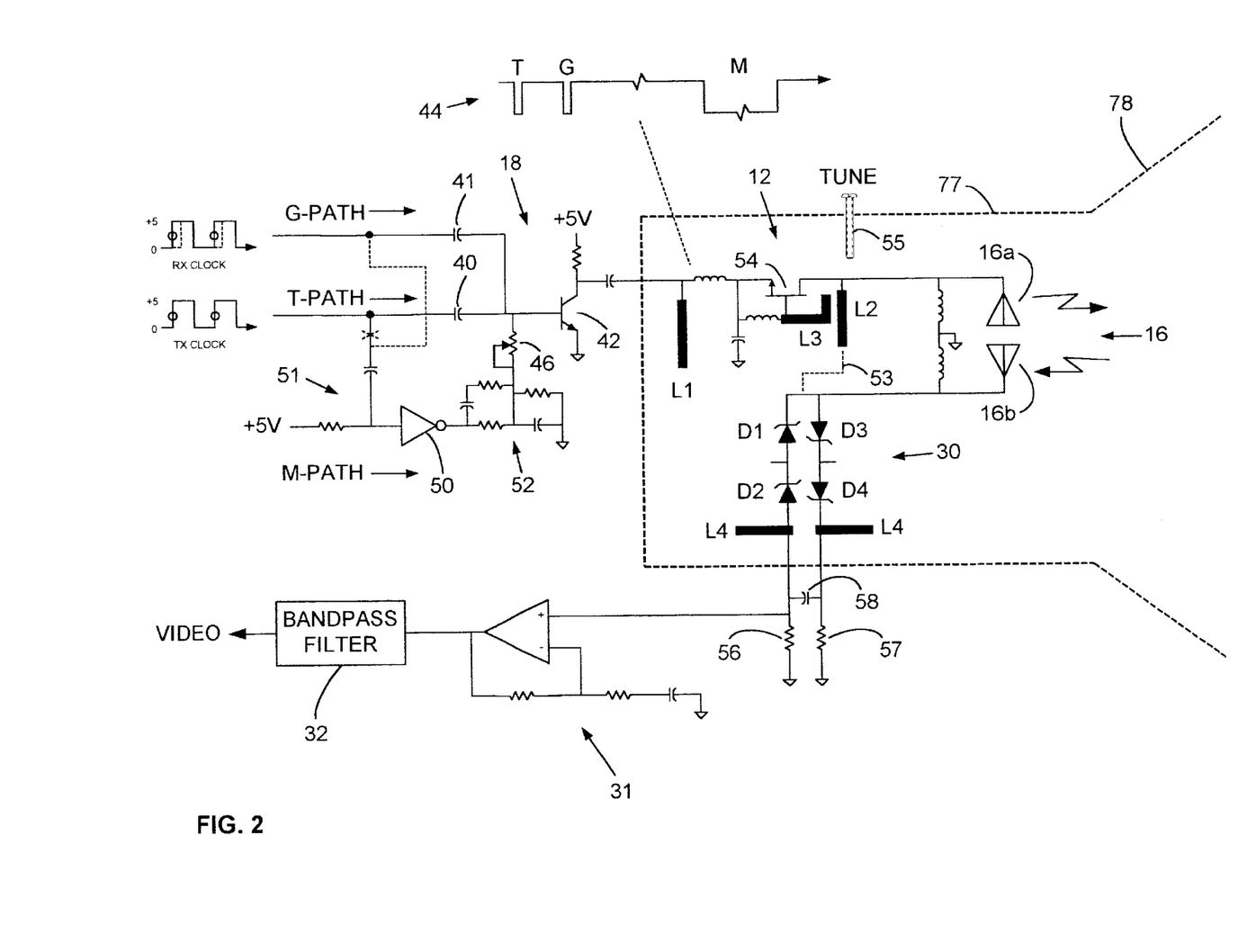
FIG. 2 is a schematic diagram of the single-antenna short-pulse microwave radar transceiver of the present invention.

FIG. 2 is a detailed schematic of the pulse driver 18, harmonic oscillator 12, antenna 16, sampler 30, amplifier 31 and bandpass filter 32 of the present invention. The TX clock signal is coupled through capacitor 40 and switching transistor 42 (which forms pulse driver 18) to provide a transmit pulse with a fast leading edge. Capacitor 40 and potentiometer 46 provide an adjustable time constant that defines the width of transmit pulse T, generally from 0.5 to 5 ns.

The particular setting of the pulse width depends on the RF parameters required of the RF system. Very short RF pulses are needed for high spatial resolution or for high data rate systems, whereas wide pulses allow for a narrower bandpass filter 32 at the video output and thus better signal to noise ratio. Also, the RF pulse width may be limited by regulatory constraints where a very short pulse may have excessive bandwidth.

Harmonic oscillator 12 is comprised of a GaAsFET 54, and several microstrip resonators labeled L1, L2, L3 connected to the source and drain of GaAsFET 54; antenna 16 is also connected to the drain. The microstrip resonators L1, L2, and L3 are all approximately one-quarter wavelength long at the fundamental frequency of oscillation, which is 12.05 GHz for a 24.1 GHz radiated frequency. Antenna 16 is comprised of two feeds 16a, 16b which are quarter-wave resonant at the second harmonic, or 24.1 GHz, and combined into a single waveguide 77 to form a single antenna 16 when viewed from outside waveguide 77. Antenna element 16a resonates at 24 GHz and provides a low impedance to the drain of the GaAsFET for maximum harmonic extraction. Experiments show that second harmonic generation at 24.1 GHz is only 4 dB lower than the same transistor operating in the fundamental mode at a frequency of 24.1 GHz.

One of the microstrip resonators, either L2 or L3, can be adjusted in length or may have a short wire or metal tab (not shown in FIG. 2) attached to it to fine-tune the oscillator frequency. Alternatively, a metal screw 55 can be brought close to one of the microstrips for fine-tuning.

The entire oscillator circuit 12 is placed inside a waveguide 77 that operates beyond cutoff at 12 GHz to substantially reduce unwanted radiation at the 12 GHz fundamental frequency. Thus, waveguide 77 is somewhat greater than one-quarter wavelength high (so the quarter-wave antenna fits inside) and one-half wavelength wide at 24 GHz. A horn 78 is coupled to the waveguide to provide gain and reduce sidelobe radiation. In one prototype, the horn flares from 4×6 mm to 20×50 mm and provides about 18 dB gain at 24 GHz.

Harmonic oscillator 12 operates at 12 GHz (but produces a transmit signal at 24 GHz) and has three key advantages over a fundamental mode oscillator 20 operating at 24 GHz. First, all the microstrip dimensions are twice as long. This is critical, since the microstrip dimensions at 24 GHz become smaller than the SMT transistor leads. Second, the harmonic oscillator can start up very rapidly since the GaAsFET has much higher gain at 12 GHz than at 24 GHz. This is particularly true when package parasitics are factored in. There appears to be a "wall" at about 22 GHz, beyond which SMT devices will not oscillate without special layout techniques.

The third advantage to a harmonic oscillator is that the startup phase of oscillation is very independent of external RF at double frequency, i.e., received signals at 24 GHz.

Experiments show that the slightest RF present at 24 GHz will alter both the startup phase and the oscillation envelope risetime of a 24 GHz oscillator. Consequently, vitally needed phase coherence is lost, and when the oscillator is used as a local oscillator, the external-RF modulated local oscillator envelope causes extremely high noise in the detector.

GaAsFET transistor 54 is a NEC type NE42484A, silicon bipolar transistor 42 is an NEC type NE68533, and inverter 50 (described below) is type 74AC04.

The diodes (D1–D4) of sampler 30 receive 24 GHz echoes from receive monopole 16b plus 12 GHz oscillations from oscillator 12, coupled from resonator L2 via a proximity coupling path indicated by dashed line 53. Thus the input to sampler 30 is comprised of an algebraic sum of 24 GHz echoes and 12 GHz oscillator G pulses (as well as T pulses, which are generally excluded from the swept timing window).

The back-to-back connection of detector diodes D1–D2 and D3–D4 results in conduction on each half cycle of the 12 GHz oscillation provided by oscillator 12. The net effect is the same as a single diode conducting on every full cycle of a 24 GHz local oscillator. Accordingly, the sampler 30 operates on the second harmonic of oscillator 12. Experiments show that this frequency doubling harmonic sampler has nearly the same sensitivity as a non-harmonic 24 GHz local oscillator and sampler. In addition to harmonic sampling, a key advantage to the back-to-back diode connection is rejection of local oscillator noise, since the back-to-back connection develops zero offset bias (in principle), and consequently there can be little noise due to the local oscillator.

Quarter wave microstrips L4 provide 24 GHz RF shorts at the video output end of the sampler to prevent spurious RF leakage to the amplifier 31. These RF shorts also enhance the detection efficiency of diodes D1–D4. Amplifier 31 amplitude-scales and impedance-buffers the detected signal. The signal is then passed through a bandpass filter 32 to limit noise and, in some cases, to provide Doppler filtering for velocity discrimination.

Sampler diodes D1–D4 are connected as series pairs (D1–D2 and D3–D4) and then as back-to-back (or antiparallel) pairs. The diodes are connected in series to cut the terminal capacitance in half. Yet the terminal inductance of two leads in a series connection remains about the same as two leads for a single diode. This assumes the diodes are on a common substrate and packaged in a single SMT package. The inductance between the diodes connected in series is limited to a small on-chip inductance and is negligible compared to the lead inductance of the package. Experiments show that a single 0.25 pF Schottky diode in a small SMT package has a detector bandwidth of about 10 GHz, whereas a series pair (e.g., D1–D2 or D3–D4) has a bandwidth of greater than 20 GHz. Schottky sampling diodes D1–D4 are HP type HSMS-286C and the op amp 86 of low frequency amp 31 is a TI type TL071.

Ballast resistors 56 and 57 are connected to the diode outputs to provide a defined detection current though the detector diodes. A steady positive detection voltage is developed across resistor 57 and a steady negative voltage is developed across resistor 56 as the result of repetitive conduction and peak holding action of the diodes in conjunction with several pico-Farads of stray capacitance. Capacitor 58 provides an effective short-circuit at all detected, i.e., video frequencies of interest, so the combined signal outputs of the two branches of diode 30 are conducted to amplifier 31. Out-of-phase noise appearing across resistors 56, 57 is shorted-out by capacitor 58, resulting in an effective cancellation of noise from oscillator 12. At the same time, ballast resistors 56, 57 help maintain a balanced conduction of the two branches of sampler 30 to help ensure a high level of oscillator noise rejection (better balance leads to greater cancellation of the positive and negative noise components appearing at the output of sampler 30).

A receive (RX) clock signal is coupled to driver 18 via a gating path (shown as G-path in FIG. 2) which is similar to the transmit path (shown as T-path in FIG. 2), i.e., through capacitor 41 to transistor 42. In the gating path, the timing of the receive clock is swept in phase relative to the transmit clock to provide a range scan. Each positive edge of either the TX or the RX clock will switch-ON transistor 42 for about 1-nanosecond, i.e., for a duration set by capacitors 40 and 41 for the T pulse and the G pulse respectively, and in conjunction with potentiometer 46.

A marker pulse is produced through a marker path (shown as M-path in FIG. 2) comprised of a timing network 51 connected to TX clock, a logic inverter 50 to set operation on the negative-going edge of the TX clock, a shaping network 52, potentiometer 46, and then through switching transistor 42 to oscillator 12. On each negative edge of the TX clock, a 60 ns wide pulse is coupled through path M to produce a 60 ns wide oscillator pulse which radiates from horn 78 to create a relatively narrow marker spectrum relative to the broad low-amplitude spectrum radiated by the 1 ns transmit pulse T, thereby marking the center frequency of the emissions from transceiver 10. Without the marker pulse, the emission spectrum is so broad and flat that there is no discernable center frequency.

Shaping network 52 slows the transition times of the pulses coupled to driver transistor 42, and in turn it slows the transition times of the driver pulses coupled to oscillator 12. With sufficiently slow drive pulses, typically with transition times of 0.5 ns or slower, oscillator 12 will start oscillating with a random phase relative to the drive pulse transitions. Thus, on each repetition of the TX clock, a random-phase marker pulse is emitted (random with respect to the negative edges of the TX clock, and random to the positive edges of both the TX and RX clocks). Since sampler 30 integrates multiple repetitions of gated echoes, echoes produced by the marker pulses are integrated to zero, since random-phase pulses average to zero after many pulse integrations.

Alternatively, marker path M may be coupled from the gating path G, i.e., network 51 is connected to RX clock such that marker pulses are generated with each negative transition of the RX clock. In this case, the marker pulses may be coherent with respect to either or both the TX and RX clock, since echoes from the marker pulse are stationary in time relative to the receive clock, i.e., there is no time sweep relative to the RX clock, and so the output from sampler 30 due to the marker pulses is at zero frequency, i.e., DC. Accordingly, bandpass filter 32 rejects this DC component such that the presence of the marker pulses has no effect on the normal operation of transceiver 10 using the T and G pulses. Waveform 44 shows the relation between pulses T, G and M.

FIG. 3a plots actual data for the video output of radar transceiver 10 with its timing set to produce an equivalent time output having characteristics matching an ultrasonic rangefinder. The time scale is set by adjusting the sweep rate of the RX clock to produce an equivalent time scale of 0.15 meters/millisecond, exactly the same as a ranging transceiver based on ultrasound. Thus, the transceiver is an ultrasound mimicking radar (UMR). In addition to matching the time scale with ultrasound, the transceiver output of FIG. 3a is a burst having a frequency of 24 kHz, exactly as though it were a 24 kHz ultrasound burst, and not a 24 GHz radar burst as it is in reality. Furthermore, the radar wavelength at 24 GHz is nearly an exact match for an ultrasonic system operating at 24 kHz, so the radar antenna can have a matching footprint to an ultrasonic transducer of the same beamwidth.

FIG. 3b plots actual data from a 40 kHz ultrasound system using commercial 40 kHz transmit and receive transducers and ranging to the same metal target plate at the same 3-meter range as the UMR of FIG. 3a. As a comparison, the UMR output of the present invention is seen to be essentially the same as the output of an ultrasonic rangefinder. Thus, ultrasonic transducers can be exchanged with UMR while retaining the same video processing, e.g., automatic gain control, threshold detection and range counting.

Figure 4A:
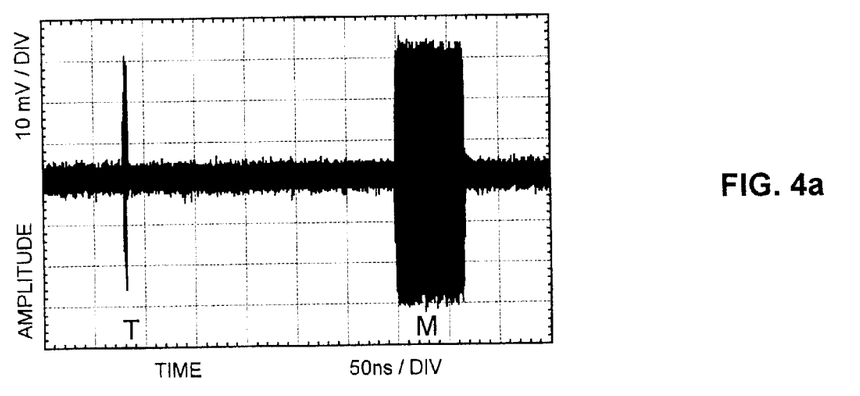
FIG. 4a plots the recorded RF emission in the time domain.

FIG. 4a plots actual data for the radiated signal from antenna 16. A short transmit pulse T is radiated with a pulse width of 500 ps followed by a 60 ns wide marker pulse M. The 24 GHz sinusoids cannot be seen because they are too closely spaced to be resolved in the plot—the T pulse alone contains about 12 cycles. Also, the thick trace between the T and M pulse arises from noise in the oscilloscope combined with the plot being set for peak-envelope mode.

Figure 4B:
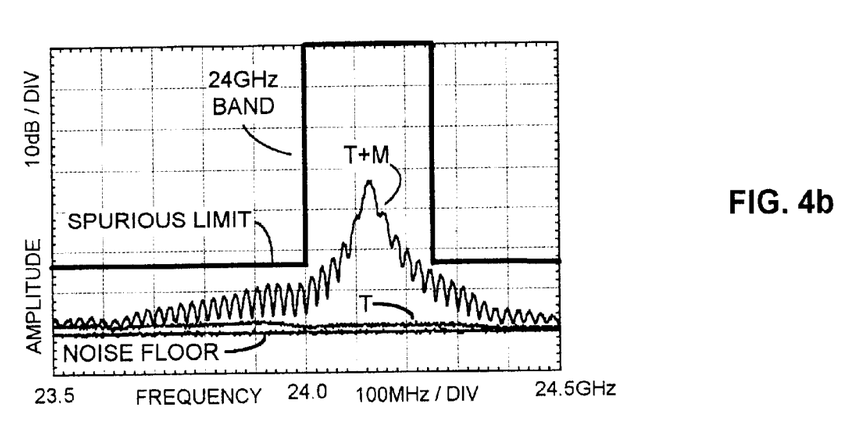
FIG. 4b plots the recorded emission spectrum with and without a marker pulse.

FIG. 4b shows the spectrum of the waveform of FIG. 4a, as the T+M trace. The 24 GHz band, as defined by the FCC, has been overlaid to show that the T+M pulse fits in the band and any signal that falls outside the 24 GHz band is below the spurious limit. Trace T shows the spectrum of the T pulse alone, with the marker pulse M deleted. It is barely above the noise floor, even though the antenna spacing from antenna 16 to the spectrum analyzer antenna used to take this data was only 3 cm. While the spectrum from T is barely detectable, it can create problems for regulatory agencies interested in measuring center frequency and spectral width.

Figure 4C:
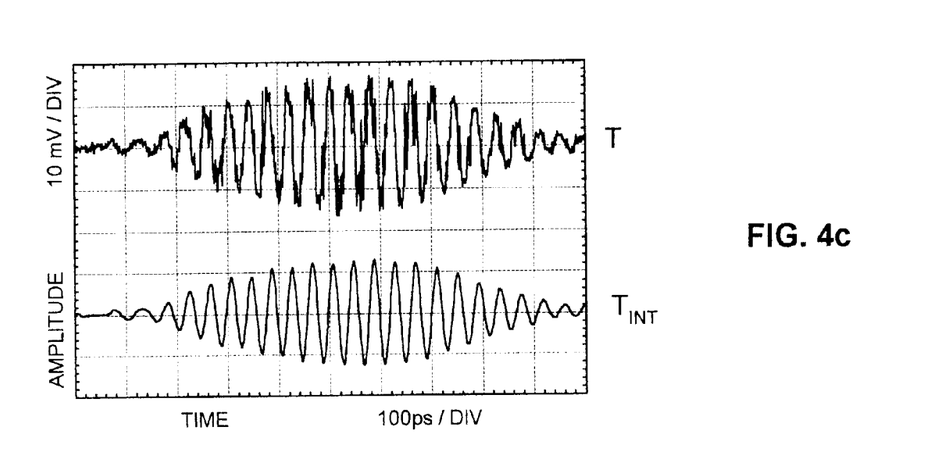
FIG. 4c plots the recorded ranging pulse (T) and its 256-repetition average ($T_{int}$).

FIG. 4c plots actual data for a coherent phase 24 GHz 500-picosecond wide transmit burst T, as recorded on a Tektronix sampling oscilloscope (upper trace) and a 256 trace integration, or waveform average, of 256 iterations of the transmitted 24 GHz RF pulse T (lower trace). The reduction in noise with coherent integration is very pronounced.

Figure 4D:
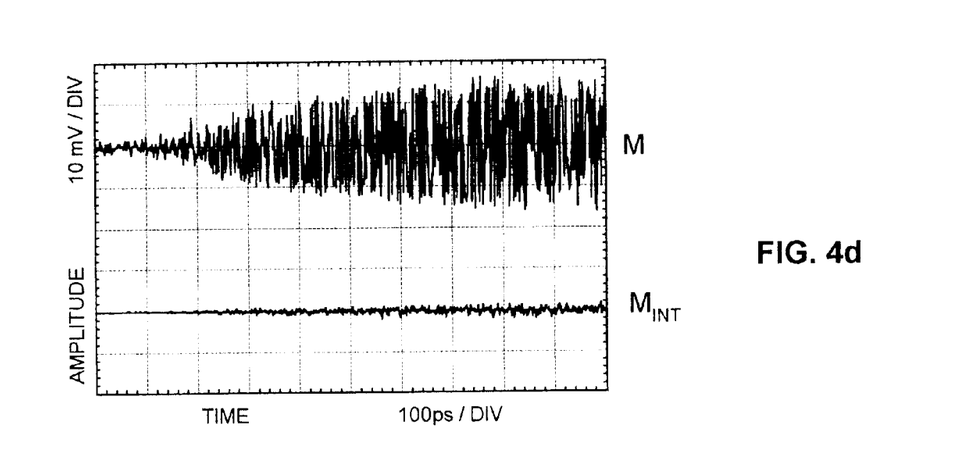
FIG. 4d plots the recorded marker pulse (M) and its 256-repetition average ($M_{int}$).

FIG. 4d plots actual data under the same conditions as in FIG. 4c for a random phase 24 GHz marker pulse M. The pulse structure seen in the upper trace is random since the phase is random. The lower trace shows the impact of 256 waveform integrations: the M pulse is effectively averaged to zero. This is in contrast to the clean pulse created in FIG. 4c by the integration of the coherent phase pulses. Accordingly, spurious echoes of the M pulse integrate to zero and do not create an interference signal, i.e., a ghost reflection. The transceiver of FIG. 1 performs integration partially or wholly in the sampler 30 and may further integrate the sampled signal by means of the band-limiting, or integrating, action of bandpass filter 32.

Figure 5:
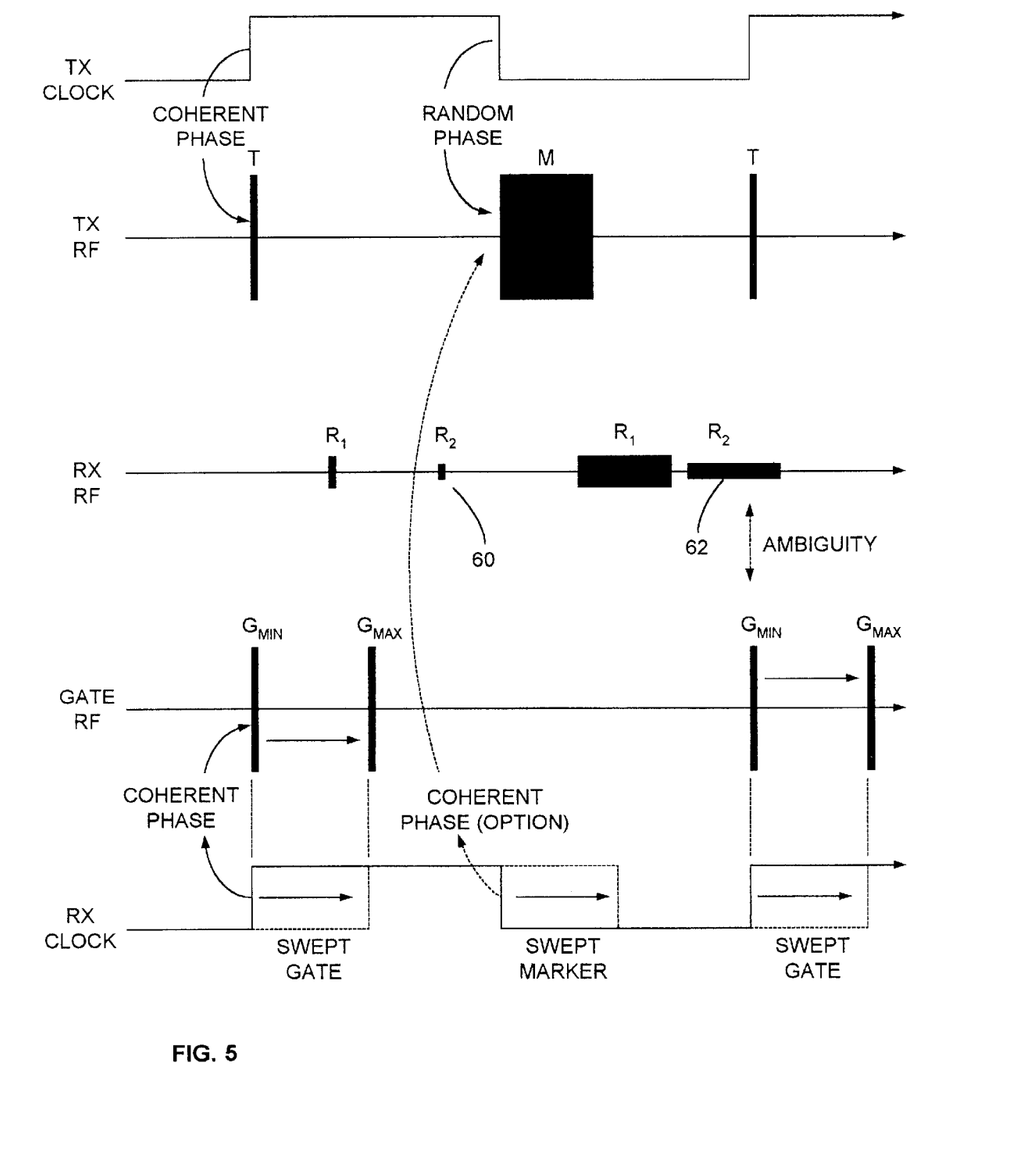
FIG. 5 is a timing diagram showing the relation between the clocks and the RF bursts.

FIG. 5 illustrates a timing diagram for the transceiver of FIG. 1. One cycle of the TX clock is shown in the top trace as a reference waveform. At each positive transition of the TX clock a T pulse is emitted with a coherent, i.e., consistent, phase relative to the TX clock. At each negative transition of the TX clock an M pulse is emitted with a random phase relative to the TX clock. These pulses are shown as solid blocks to indicate a large number of sinusoids within each block. The next lower trace, RX RF, depicts the echoes from the T and M pulse emissions for two targets at ranges R1 and R2. The GATE RF trace shows the timing relation for gate pulses G, which are swept in time relative to the TX clock, from $G_{min}$ to $G_{max}$, or the minimum and maximum ranges in the range sweep. Whenever the G pulse is coincident with an echo pulse at R1, sampler 30 will produce an output for that point in the sweep of the G pulse. Since the reflection of a T pulse from a target at R2 (60) is beyond the maximum sweep at $G_{max}$, it will not be detected. However, a reflection of an M pulse from a target at R2 (62) falls into the next clock cycle and into the sweep range of G. It appears as a range ambiguity, i.e., it looks like an in-range target. Since the phase of the M pulse is random, so too is the phase of its echo at R2 (62). Thus, coherent integration of this echo by sampler 30 and bandpass filter 32 will average this spurious reflection to near-zero.

The bottom trace in FIG. 5 shows an optional timing arrangement for the marker pulse M, wherein the M pulse is initiated by the negative transition of the receive clock with coherent phase or incoherent phase relative to the RX clock. This negative transition can be swept in time just as the G pulse is swept, such that the time between the G and M pulses remains somewhat constant. Consequently, sampler 30 will always sample the same part of the reflected M pulse 62 and produce a DC or near-DC output. Bandpass filter 32 can then filter out these low frequency components. With either timing relation for the M pulse, spurious echoes from the M pulse are minimized.

Although the invention has been described with reference to a 24 GHz system because of the high interest in this frequency, the principles of the invention can be applied to other frequencies, e.g., 10.5 GHz and 38 GHz. The techniques using harmonic transmit pulses and sub-harmonic sampling can be similarly applied.

Changes and modifications in the specifically described embodiments can be carried out without departing from the scope of the invention which is intended to be limited only by the scope of the appended claims.

What is claimed is:

1. A pulsed microwave transceiver apparatus comprising:
a transmit clock for generating a transmit clock signal;
a receive clock for generating a receive clock signal;
a pulse driver connected to the transmit and receive clocks for generating transmit drive pulses and receive gate drive pulses in response to the respective transmit and receive clock signals;
a pulsed RF oscillator connected to the pulse driver for producing transmitter RF bursts in response to the transmit drive pulses and receiver RF gating bursts in response to gate drive pulses;
a first antenna connected to the pulsed RF oscillator to form a transmit antenna to transmit the transmitter RF bursts;
a sampler connected to the pulsed oscillator;
a selected one of the first antenna or a second antenna connected to the sampler to from a receive antenna to receive RF bursts;
wherein receiver RF gating bursts from the oscillator gate the sampler to detect RF bursts received by the receive antenna;
circuitry connected to the sampler to provide a detected baseband output.

2. The apparatus of claim 1 wherein the pulsed RF oscillator is a pulsed harmonic oscillator.

3. The apparatus of claim 1 wherein the pulsed RF oscillator and transmit antenna are located inside a waveguide.

4. The apparatus of claim 1 wherein the transmitter RF bursts and the receiver RF gating bursts are phase coherent with their respective transmit and receive clocks.

5. The apparatus of claim 4 wherein the pulse driver produces pulses to shock excite the oscillator into phase coherent microwave oscillation.

6. The apparatus of claim 1 wherein the receive clock operates at about a 10 Hz–10 kHz offset frequency from the transmit clock.

7. The apparatus of claim 1 wherein the receive clock operates with swept timing relative to the transmit clock.

8. The apparatus of claim 1 wherein at least one of the transmit or receive clocks is modulated in frequency, phase or amplitude for purposes of conveying information, spectrum spreading, or channelizing.

9. The apparatus of claim 1 wherein the pulsed RF oscillator is a fundamental frequency pulsed oscillator.

10. The apparatus of claim 1 wherein the pulsed RF oscillator comprises a pulsed microwave oscillator operating at a sub-multiple of the transmit frequency.

11. The apparatus of claim 1 wherein the sampler comprises anti-parallel diodes having first, second, and third nodes, an RF input being coupled to the first node, the pulsed RF oscillator being coupled to the first node, and detected outputs being coupled from the second and third nodes.

12. The apparatus of claim 11 wherein the second and third nodes are loaded with ballast resistors.

13. The apparatus of claim 1 wherein the RF oscillator is pulsed on for less than 100 ns.

14. The apparatus of claim 1 wherein the RF oscillator is pulsed on for less than 10 ns.

15. The apparatus of claim 1 wherein the RF oscillator is pulsed on for less than 1 ns.

16. A pulsed microwave transceiver comprising:
a pulsed microwave oscillator operating at a frequency which is a sub-multiple of a transmit frequency;
an antenna connected to the oscillator, the antenna being resonant at the transmit frequency;
a sampling detector gated by the pulsed microwave oscillator.

17. The microwave transceiver of claim 16 wherein the pulsed microwave oscillator and resonant antenna are located inside a waveguide.

18. The microwave oscillator of claim 17 wherein the waveguide is dimensioned to cutoff below the transmit frequency, to reduce or eliminate sub-harmonic emissions.

19. A pulsed microwave harmonic sampler comprising:
a pulsed RF oscillator;
anti-parallel detector diodes having first, second and third nodes;
an RF input coupled to the first node;
the pulsed RF oscillator also being coupled to the first node;
detected outputs being coupled from the second and third nodes.

20. The harmonic sampler of claim 19 wherein the pulsed RF oscillator operates at an even sub-multiple of a detected RF input frequency.

21. The harmonic sampler of claim 19 wherein each detector diode comprises a series pair within a common package.

22. The harmonic sampler of claim 19 wherein the sampler is an integrating sampler which coherently integrates pulses from multiple RF oscillator pulses.

23. The harmonic sampler of claim 19 wherein the pulsed RF oscillator and the detector diodes are located inside a waveguide.

24. A method of transmitting and receiving microwave pulses, comprising:
transmitting pulses from a microwave oscillator at a first time;
pulsing the microwave oscillator at a second time which second time sweeps over a range of times to gate a sampler;
sampling pulses which were transmitted from the microwave oscillator and reflected from an object with the sampler;
integrating two or more samples from the sampler.

25. The method of claim 24 wherein transmitting pulses from a microwave oscillator comprises transmitting pulses from a harmonic oscillator.

26. A method of transmitting and receiving microwave pulses, comprising:
operating a pulsed RF oscillator at a first frequency;
coupling the pulsed RF oscillator to a resonant antenna which is resonant at a second frequency which is a harmonic of the first frequency to produce a transmitted signal at the second frequency;
receiving a reflected signal at a resonant antenna which is resonant at the second frequency;
sampling the received signal in response to the pulsed RF oscillator.

27. A method of transmitting microwave pulses having a marker spectrum, comprising,
transmitting transmit pulses from a microwave oscillator in coherent phase to a clock at a first time;
transmitting marker pulses which are wider than the transmit pulses from the microwave oscillator in random phase to a clock at a second time.

28. The method of claim 27 wherein transmitted pulses are coherently phased with a transmit clock at the first time and are randomly phased with a transmit or receive clock at the second time.

29. The method of claim 27 wherein the transmit pulses and marker pulses form a transmit signal having a marker RF spectrum in a radar ranging system for providing a measurable center frequency, the transmit pulses and marker pulses comprising:

a transmit RF sinewave burst coherently phased to a first clock;
a marker RF sinewave burst wider than the transmit burst and randomly phased to the first or a second clock.

30. The method of claim 29 wherein the transmit signal has time-interleaved transmit and marker bursts.

31. The method of claim 30 wherein the transmit signal is an equivalent time radar transmit signal.

32. A method of transmitting microwave pulses having a marker spectrum, comprising,
transmitting transmit pulses from a microwave oscillator in coherent phase to a clock at a first time;
transmitting marker pulses which are wider than the transmit pulses from the microwave oscillator in coherent phase to a clock at a second time.

33. The method of claim 32 wherein transmitted pulses are coherently phased with a transmit clock at the first time and are coherently phased with a receive clock at the second time.

34. The method of claim 32 wherein the transmit pulses and marker pulses form a transmit signal having a marker RF spectrum in a radar ranging system for providing a measurable center frequency, the transmit pulses and marker pulses comprising:
a transmit RF sinewave burst coherently phased to a transmit clock;
a marker RF sinewave burst wider than the transmit burst and coherently phased to a swept-in-time receive clock.

35. The method of claim 34 wherein the transmit signal has time-interleaved transmit and marker bursts.

36. The method of claim 35 wherein the transmit signal is an equivalent time radar transmit signal.

37. A method of simulating an ultrasonic transceiver operating at an ultrasonic wavelength using a radar transceiver, comprising:
operating a transmit clock at a clock frequency;
producing, at the clock frequency, microwave bursts having a microwave wavelength comparable to the ultrasonic wavelength;
transmitting the microwave bursts;
receiving echo bursts of the transmitted microwave bursts;
operating a receive clock with controlled phase relative to the transmit clock;
sweeping the phase of the receive clock relative to the transmit clock;
sampling the received echo bursts with timing from the receive clock;
time-scaling a sampled replica of the echo bursts by controlling the phase sweeping to produce output echo bursts having the ultrasonic frequency and a time-of-flight comparable to the ultrasonic transceiver.

38. The method of claim 37 wherein phase sweeping the receive clock comprises operating the receive clock at an offset frequency to the transmit clock frequency or a transmit clock ratio frequency.

39. The method of claim 37 wherein phase sweeping the receive clock comprises coupling the transmit clock through a swept time-delay circuit to obtain a receive clock having phase sweeping.

* * * * *